United States Patent
Asyama et al.

(10) Patent No.: US 6,533,702 B1
(45) Date of Patent: Mar. 18, 2003

(54) SHIFT CONTROL SYSTEM OF HYDRAULIC CONTINUOUSLY VARIABLE TRANSMISSION FOR VEHICLE

(75) Inventors: Hiroki Asyama, Aichi (JP); Kaoru Kondo, Aichi (JP); Toru Hashimoto, Aichi (JP); Minoru Shouichi, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/717,305

(22) Filed: Nov. 22, 2000

(30) Foreign Application Priority Data

Nov. 22, 1999 (JP) .............................. 11-331607
Nov. 22, 1999 (JP) .............................. 11-331608
Apr. 21, 2000 (JP) .............................. 2000-121622

(51) Int. Cl.$^7$ .............................................. B60K 41/12
(52) U.S. Cl. ........................................ 477/45; 477/50
(58) Field of Search ............................ 477/37, 44, 45, 477/46, 48, 49, 50, 115

(56) References Cited

U.S. PATENT DOCUMENTS

| | | | | |
|---|---|---|---|---|
| 4,793,454 A | * | 12/1988 | Petzold et al. | 192/0.032 |
| 4,893,523 A | * | 1/1990 | Tokoro | 477/43 |
| 5,062,050 A | * | 10/1991 | Petzold et al. | 477/43 X |
| 5,074,166 A | * | 12/1991 | Yamahita et al. | 477/43 |
| 5,136,495 A | * | 8/1992 | Tokoro et al. | 477/43 X |
| 5,144,864 A | * | 9/1992 | Sawasaki et al. | 477/43 |
| 6,042,501 A | * | 3/2000 | Yamamoto | 477/48 |
| 6,120,413 A | * | 9/2000 | Kawamura | 477/50 X |
| 6,135,915 A | * | 10/2000 | Aoki et al. | 477/43 |
| 6,243,638 B1 | * | 6/2001 | Abo et al. | 477/45 X |

FOREIGN PATENT DOCUMENTS

| | | | | |
|---|---|---|---|---|
| JP | 363269745 | * | 4/1987 | 477/158 |
| JP | 363038042 | * | 2/1988 | 477/45 |
| JP | 404140555 | * | 5/1992 | 477/46 |
| JP | 6017923 A | | 1/1994 | |
| JP | 02001146960 | * | 5/2001 | 477/46 |

* cited by examiner

*Primary Examiner*—Charles A Marmor
*Assistant Examiner*—Roger Pang
(74) *Attorney, Agent, or Firm*—Birch, Stewart, Kolasch & Birch, LLP

(57) ABSTRACT

A shift control system of a hydraulic CVT for an automotive vehicle with which it is possible to control a speed ratio to a target value with certainty while maintaining a required primary pressure, even when the vehicle is substantially stationary. Normally, a speed feedback control means sets a target speed of a rotating element on the basis of the vehicle speed and the load on the vehicle engine. The speed feedback control means feedback-controls a hydraulic pressure control means of the rotating element so that the actual speed approaches the target speed. When the vehicle becomes substantially stationary, control of the hydraulic pressure control means is switched from the speed feedback control executed by the speed feedback control means to pressure feedback control executed by a pressure feedback control means. That is, the actual hydraulic pressure acting on the rotating element is detected by a hydraulic pressure detecting means. A target hydraulic pressure setting means sets a target hydraulic pressure to act on the rotating element, and the shift control valve is feedback-controlled so that the actual pressure approaches the target pressure.

18 Claims, 6 Drawing Sheets

59A primary pressure determining means
59B failure detecting means

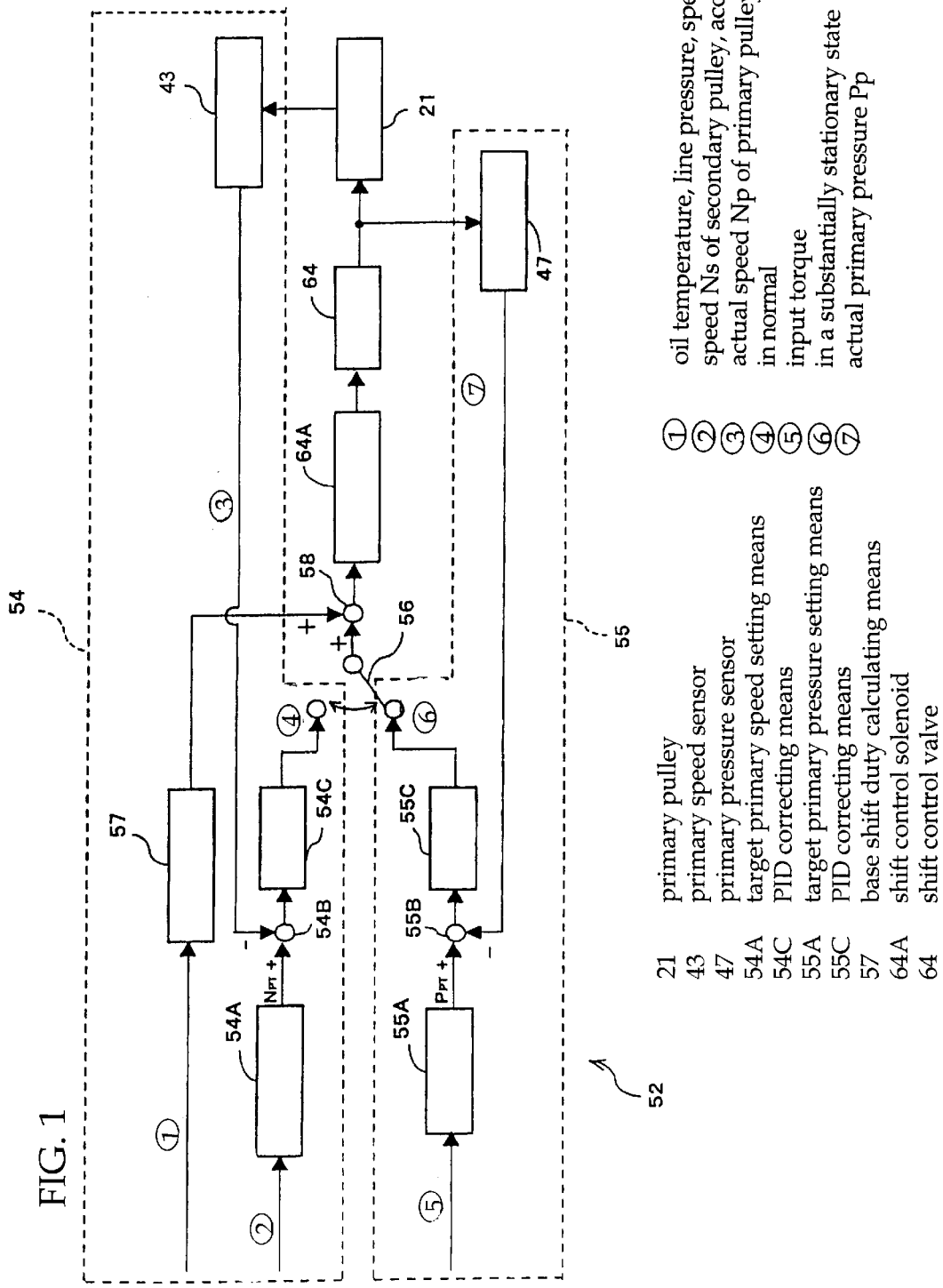

S10   a base shift duty is calculated
S50   a target primary speed Npt is calculated
S60   a shift duty is calculated (the deviation ΔNp (Npt-Np) is performed PID-correction)
S80   the shift control solenoid is driven
S110  a target primary pressure Ppt is calculated
S120  a shift duty is calculated (the deviation ΔPp (Ppt-Pp) is performed PID-correction)

S10   a base shift duty is calculated
S50   a target primary speed Npt is calculated
S60   a shift duty is calculated (the deviation ΔNp (Npt-Np) is performed PID-correction)
S80   the shift control solenoid is driven
S110  a target primary pressure Ppt is calculated
S120  a shift duty is calculated (the deviation ΔPp (Ppt-Pp) is performed PID-correction)
S124  a shift duty is calculated

SHIFT CONTROL SYSTEM OF HYDRAULIC CONTINUOUSLY VARIABLE TRANSMISSION FOR VEHICLE

DETAILED DESCRIPTION OF THE INVENTION

1. Field of the Invention

This invention relates to a shift control system of a hydraulic, continuously variable transmission for an automotive vehicle.

2. Prior Art

In recent years, continuously variable transmissions (CVT's), which control speed ratios steplessly, have attracted attention for their characteristics of enabling speed-change shocks to be avoided and for providing superior fuel economy CVT's for use in automotive vehicles have been being developed vigorously.

Generally, the speed ratio of CVT's is controlled by controlling the hydraulic pressure.

For example, in the case of a belt-type CVT, the power produced by an engine is transmitted via a belt from a primary pulley to a secondary pulley, the pulleys being rotating elements of the CVT. Normally, a gripping force is applied to the belt by a hydraulic pressure (hereinafter called "the line pressure") made to act on a hydraulic actuator for the secondary pulley, which is set in accordance with basic variables such as the torque being transmitted from the engine. The control of the speed ratio of the transmission is carried out through regulation of a hydraulic pressure (hereinafter called "the primary pressure") which acts on a hydraulic actuator for the primary pulley.

In the case of this kind of belt-type CVT, this speed ratio control (hereinafter called "shift control") is generally carried out by feedback-controlling the speed of rotation of the primary pulley. That is, shift control is carried out by setting a target speed of the primary pulley on the basis of the speed of the vehicle and a throttle angle or the like and controlling the primary pressure acting on the primary pulley so that the actual speed of the primary pulley approaches this target speed.

However, generally, when the rotational speed becomes low, detecting the rotational speed with a speed sensor becomes difficult. Consequently, when the vehicle is traveling extremely slowly or is stationary, because detection of the speed of the primary pulley is problematic, it is not possible to execute proper feedback control of the primary pulley's rotational speed. Instead the speed ratio of the transmission is controlled to a speed ratio for minimal vehicle speeds (hereinafter called "the minimum speed ratio") by open loop control wherein a predetermined pressure is applied to the primary pulley.

PROBLEMS WHICH THE INVENTION SEEKS TO SOLVE

However, with this open loop control, because its precision is poor, the following kinds of problem arise:

[1] When the primary pressure is too high, such as at times of travel in traffic jams, the transmission tends to gradually shift upwardly. Consequently, the response of the vehicle upon accelerating from a standstill deteriorates.

[2] When the primary pressure is too low, such as at times when accelerating immediately after braking suddenly, there is a risk of the speed ratio being at an intermediate level, it may not then be possible for the input torque to be transmitted, and slippage of the belt may occur. Also, the responsiveness of the transmission upshifting which accompanies an increase in the vehicle speed after the vehicle accelerates may deteriorate.

Another method of hydraulic pressure control of a hydraulic CVT, besides the speed feedback control and open loop control mentioned above, is the so-called "pressure feedback control." In pressure feedback control, the actual value of the hydraulic pressure applied to the primary pulley (hereinafter "the actual primary pressure") is detected; a target value of the hydraulic pressure acting on the primary pulley (hereinafter "the target primary pressure") is set; and the hydraulic pressure control means of the primary pulley is feedback-controlled so that the actual primary pressure approaches the target primary pressure.

However, because, for example, immediately after engine start-up the line pressure is low, it may sometimes happen that the hydraulic cylinder of the primary pulley is not filled with operating fluid. In this case, when pressure feedback control is used for the hydraulic pressure control of the primary pulley, the problem arises that the primary pressure repeatedly overshoots and undershoots and shift control becomes unstable, and satisfactory control cannot be accomplished.

Also, when there is a failure of a hydraulic pressure sensor ("hydraulic pressure detecting means") detecting the actual primary pressure, pressure feedback control itself becomes impossible, and problems arise such as the primary pressure being insufficient and the belt consequently slipping.

SUMMARY OF THE INVENTION

It is, therefore, an object of the invention to provide a shift control system of a hydraulic CVT for a vehicle with which, even when the vehicle is traveling extremely slowly or is stationary, it is possible to control the shift ratio certainly to a target value (for example, to a minimum shift ratio) while maintaining a required primary pressure.

fit is another object of the present invention to provide a shift control system of a hydraulic CVT for a vehicle with which, even when the vehicle is traveling extremely slowly or is stationary, it is possible to control a shift ratio using pressure feedback control while maintaining a required hydraulic pressure. It is also possible to control the shift ratio even when a hydraulic pressure applied to a rotating element of the CVT is insufficient or when there is a failure of hydraulic pressure detecting means.

MEANS BY WHICH THE PROBLEMS ARE SOLVED

To achieve these and other objects, in a shift control system of a hydraulic CVT for a vehicle, in a first aspect of the invention when the vehicle is not in a substantially stationary state (stationary or traveling extremely slowly), hydraulic pressure control means for controlling the behavior of a rotating element of the CVT with a hydraulic pressure is controlled by speed feedback control means so that the actual speed of the rotating element approaches a target speed set on the basis of the vehicle speed and the engine load. When the vehicle is in a substantially stationary state, the hydraulic pressure control means is controlled by pressure feedback control means so that the hydraulic pressure applied to the rotating element approaches a set target pressure.

As a result, even when the vehicle is traveling extremely slowly or is stationary, the shift ratio can be controlled certainly to a target value while maintaining the hydraulic pressure an optimal value.

Preferably, when the vehicle is substantially stationary and it is determined that the state of the transmission is such that pressure feedback control is not possible, control of the hydraulic pressure control means is switched from pressure feedback control executed by the pressure feedback control means to open loop control executed by open loop control means. Preferably, it can be determined that pressure feedback control is not possible when a failure of actual pressure detecting means for detecting the hydraulic pressure acting on the rotating element or when the actual pressure applied on the rotating element is below a reference pressure.

It can be inferred that the actual hydraulic pressure detecting means has failed when the detection value from the actual hydraulic pressure detecting means is outside a predetermined range.

In a shift control system of a hydraulic CVT for a vehicle, according to a second aspect of the invention, the actual value of the hydraulic pressure applied to a rotating element of the CVT is detected; a target value of the hydraulic pressure applied to the rotating element is set; and hydraulic pressure control means controlling the rotating element is controlled using pressure feedback control so that the actual value of the hydraulic pressure acting on the rotating element approaches the target value. Also, at this time it is determined whether the state of the transmission is such that this pressure feedback control is possible. When it is determined that pressure feedback control is not possible, control of the hydraulic pressure control means is switched from pressure feedback control to open loop control wherein a predetermined hydraulic pressure is made to be applied to the rotating element.

Preferably, it is determined that pressure feedback control is not possible when failure of actual hydraulic pressure detecting means detecting the hydraulic pressure being applied to the rotating element occurs or when the actual hydraulic pressure being applied to the rotating element is below a reference pressure. It can be inferred that the actual hydraulic pressure detecting means has failed when the detection value from the actual hydraulic pressure detecting means is outside a predetermined range.

More preferably, the vehicle speed is detected, and when the vehicle speed is above a predetermined value, control of the hydraulic pressure control means is switched from pressure feedback control or open loop control to speed feedback control wherein the hydraulic pressure control means is feedback-controlled so that the speed of the rotating element approaches a target speed set on the basis of the vehicle running state.

When the CVT is a belt-type CVT made up of a primary pulley, a secondary pulley and an endless belt passing around the two pulleys, the rotating element mentioned above can be taken to mean a primary pulley controlled by a supply of hydraulic pressure to a primary cylinder, and the hydraulic pressure detecting means mentioned above can be provided as a hydraulic pressure sensor detecting the hydraulic pressure supplied to this primary pulley.

BRIEF DESCRIPTION OF THE DRAWINGS

FIG. 1 is a block diagram showing a main part of a first preferred embodiment of a shift control system of a hydraulic CVT for a vehicle according to the invention;

DETAILED DESCRIPTION OF THE PREFERRED EMBODIMENTS

Figure 2A:
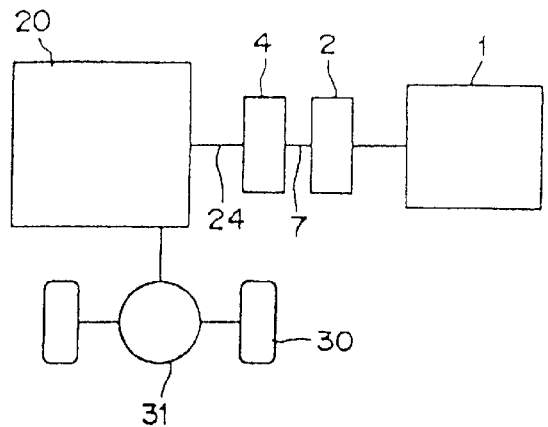
FIG. 2 are schematic views illustrating a power transmission system of a vehicle provided with the hydraulic CVT of the first preferred embodiment, FIG. 2A showing the power transmission train including the CVT and FIG. 2B showing the construction of the CVT.
Figure 2B:
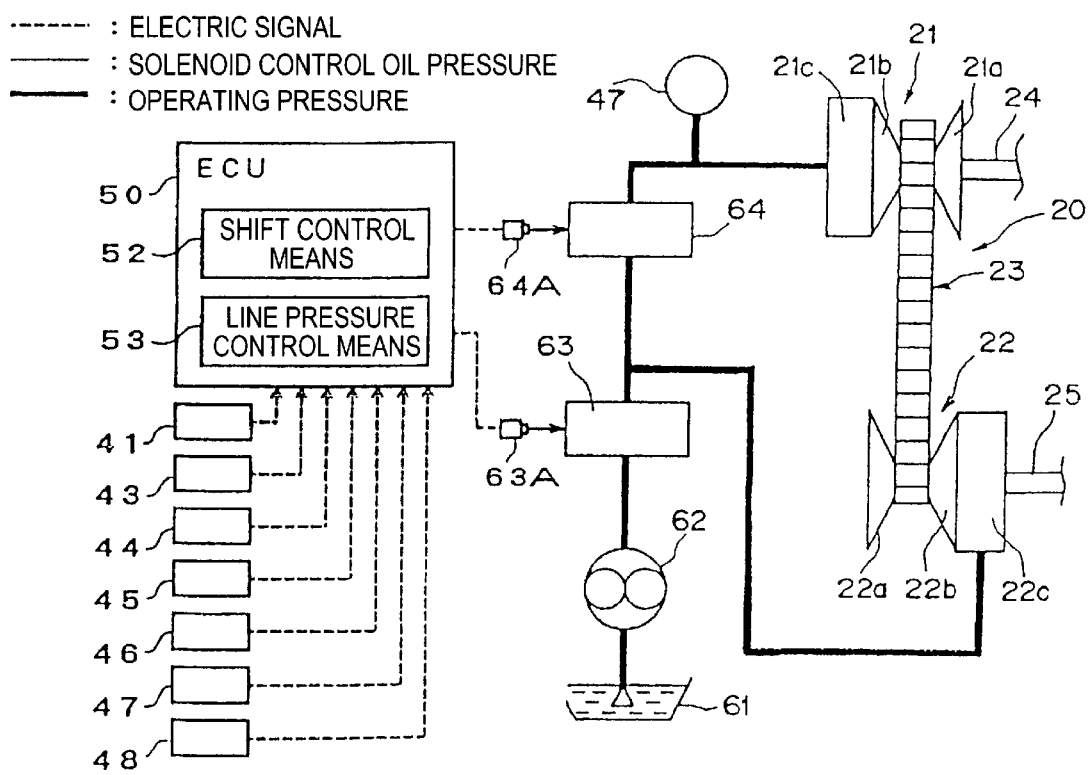
Figure 3:
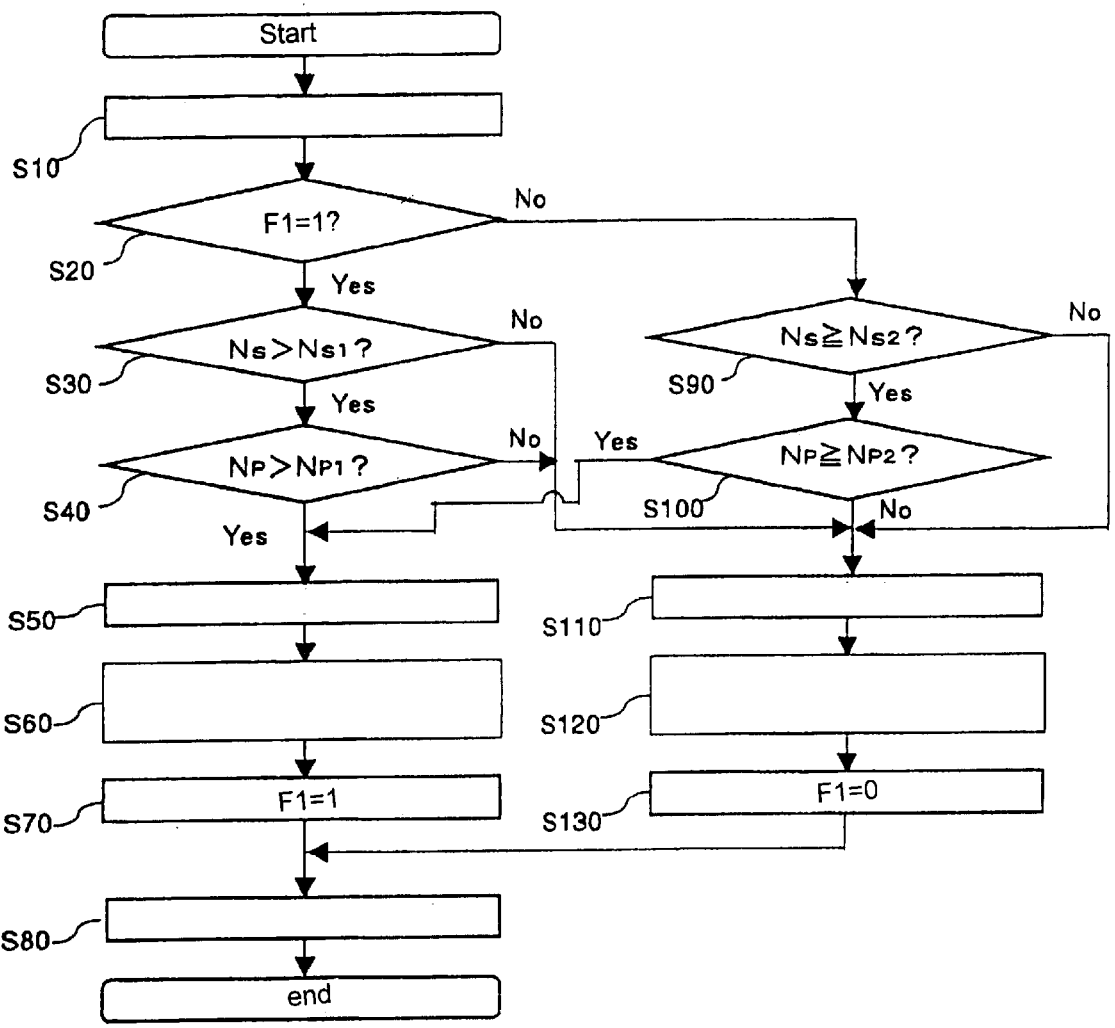
FIG. 3 is a flow chart showing control performed by the shift control system of the first preferred embodiment.

A first preferred embodiment of the invention will now be described, with reference to the drawings. FIGS. 1 through 3 show a first preferred embodiment of a shift control system of a hydraulic continuously variable transmission for an automotive vehicle according to the invention. First, the vehicle power transmission mechanism of this preferred embodiment will be discussed. As shown in FIGS. 2A and 2B, in this power transmission mechanism, torque outputted from an engine 1 is transmitted through a torque convertor 2 to a belt-type CVT 20 and then on to a front differential 31.

A forward-reverse switching mechanism 4 is disposed between the output shaft 7 of the torque convertor 2 and a primary shaft 24, which is the input shaft of the belt-type CVT 20, and torque outputted from the engine 1 through the torque convertor 2 is inputted to the belt-type CVT 20 via this forward-reverse switching mechanism 4. This belt-type CVT 20 is a hydraulic CVT wherein shift control is executed through hydraulic control.

The belt-type CVT 20 is made up of a primary pulley (rotating element) 21 which is coaxial and integral with the primary shaft 24. A secondary pulley 22 is provided which is coaxial and integral with a secondary shaft 25, which shaft is parallel to the primary shaft 24. A belt 23 passes around the two pulleys 21, 22. Torque inputted from the forward-reverse switching mechanism 4 to the primary shaft 24 is inputted from the primary pulley 21 via the belt 23 to the secondary pulley 22.

The primary pulley 21 is made up of two rotating sheaves 21a, 21b that integrally rotate with each other. Similarly, the secondary pulley 22 is made up of two rotating sheaves 22a, 22b that integrally rotate each other. The sheaves 21a, 22a are fixed to the respective shafts 24 and 25, and the other sheaves 21b, 22b are movable in the axial direction by respective hydraulic actuators 21c, 22c.

A pushing force exerted on the moving sheave 22b toward the fixed sheave 22a is adjusted by a line pressure PL regulated by a line pressure regulating valve 63 being supplied to the hydraulic actuator 22c of the secondary pulley 22. Hydraulic fluid from an oil tank 61, pressurized by an oil pump 62, constitutes the source of pressure for the line pressure PL.

Also, an operating fluid which is flow-regulated by a shift control valve 64 serves as a hydraulic pressure control means with the line pressure PL as a source pressure is supplied to the hydraulic actuator 21c of the primary pulley 21. A pushing force exerted on the moving sheave 21b toward the fixed sheave 21a is adjusted by this operating fluid acting at a primary pressure Pp.

The line pressure regulating valve 63 is controlled through duty control of a line pressure control solenoid 63A.

The shift control valve 64 is controlled through duty control of a shift control solenoid 64A.

It is important from the point of view of minimizing energy lost to the oil pump 62 and maximizing the durability of the transmission itself that the line pressure PL be made as low as possible, within a range, such that slippage of the belt 23 can be avoided and power transmission accomplished. To achieve this, a belt tension control pressure (corresponding to the line pressure) Pout is set on the basis of variables such as the torque transmitted from the engine 1, and line pressure control is accomplished by the line pressure regulating valve 63 being controlled to regulate the delivery pressure of the oil pump 62 on the basis of this belt tension control pressure Pout.

The line pressure PL, which is applied to the hydraulic actuator 22c of the secondary pulley 22, and the primary pressure Pp, which is applied to the hydraulic actuator 21c of the primary pulley 21, are each controlled by a command signal from an electronic control unit (ECU) 50 serving as a control means.

Detection signals from an engine speed sensor 41, a throttle angle sensor 46, a primary speed sensor 43 constituting speed detecting means for detecting the speed of rotation of the primary pulley 21, a secondary speed sensor 44 constituting vehicle speed detecting means for detecting the speed of rotation of the secondary pulley 22, a line pressure sensor 45 for detecting the line pressure, a primary pressure sensor 47 constituting actual hydraulic pressure detecting means for detecting the primary pressure Pp, an A/F sensor 48 for detecting an air-fuel ratio A/F, and an oil temperature sensor (not shown) for detecting the temperature Toil of the operating fluid are each inputted to the ECU 50. The ECU 50 then controls the line pressure regulating valve 63 and the shift control valve 64 in the hydraulic fluid supply lines to the pulleys 21, 22 on the basis of these detection signals.

As shown in FIG. 2B, the ECU 50 includes a shift control means 52 for executing control of the shift control valve 64 (shift control) and a line pressure control means 53 for executing control of the line pressure regulating valve 63 (line pressure control). As shown in FIG. 1, the shift control means 52 has a speed feedback control means 54 for executing speed feedback control of the shift control valve 64, which controls the hydraulic pressure to the primary pulley 21; a pressure feedback control means 55 for executing pressure feedback control of the shift control valve 64; and a switching means 56 for switching between speed feedback control and pressure feedback control.

The speed feedback control means 54 is made up of a target primary speed setting means (target speed setting means) 54A for setting a target speed Npt of the primary pulley 21 on the basis of parameters corresponding with the vehicle speed (for example, the speed Ns of the secondary pulley 22) and the load of the engine 1 (for example, an accelerator angle); a calculating means (a subtractor) 54B for calculating the deviation $\Delta Np$ ($=Npt-Np$) between the actual speed Np of the primary pulley 21 detected by the primary speed sensor 43 and the above-mentioned target speed Npt; and a PID correcting means 54C for performing PID-correction (proportional correction (P-correction), integral correction (I-correction) and differential correction (D-correction)) on this deviation $\Delta Np$. On the basis of a control level (shift duty) obtained by performing PID-correction on the deviation $\Delta Np$, the speed feedback control means 54 can feedback-control the shift control valve 64 so that the actual speed Np of the primary pulley 21 approaches the target speed Npt.

The pressure feedback control means 55 is made up of the primary pressure sensor 47 detecting the operating fluid pressure (the primary pressure Pp) applied to the hydraulic actuator 21c of the primary pulley 21; a target primary pressure setting means (target hydraulic pressure setting means) 55A for setting a target primary pressure Ppt, which is a target value of the primary pressure Pp, on the basis of the input torque inputted to the belt-type CVT 20; a calculating means (a subtractor) 55B for calculating the deviation $\Delta Pp$ ($=Ppt-Pp$) between the primary pressure Pp detected by the primary pressure sensor 47 and the target primary pressure Ppt; and a PID correcting means 55C for performing PID-correction on this deviation $\Delta Pp$. On the basis of a control level (shift duty) obtained by performing PID-correction on the deviation $\Delta Pp$, the pressure feedback control means 55 can feedback-control the shift control valve 64 so that the actual primary pressure Pp approaches the target primary pressure Ppt.

The input torque Tin to the primary pulley 21 can be calculated from the output torque Te of the engine during steady rotation, an output torque increase $\Delta Te$ and a torque ratio t of the torque convertor 2 on the basis of the following expression:

$$Tin = (Te + \Delta Te) \times t$$

In this expression, the sum ($Te+\Delta Te$) of the steady rotation output torque Te and the engine torque increase $\Delta Te$ is equivalent to the output torque of the engine 1, and this output torque ($Te+\Delta Te$) is multiplied by the torque ratio t to factor in the effect of the torque convertor 2 as the torque is inputted to the primary pulley 21 of the belt-type CVT 20.

The torque ratio t can be calculated on the basis of the input/output speed ratio of the torque convertor 2. This input/output speed ratio is the value (Nin/Ne) of the output speed Nin of the torque convertor 2 (the speed Np of the primary pulley 21) divided by the input speed of the torque convertor 2 (the speed Ne of the engine 1). The output torque Te of the engine 1 during steady rotation can be estimated from the engine speed Ne detected by the engine speed sensor 41 and the throttle angle $\theta$ detected by the throttle angle sensor 46. Here, the output torque Te is obtained using a map associating the output torque Te with the engine speed Ne and the throttle angle $\theta$. Alternatively, the output torque Te may be obtained from the engine speed Ne and an intake charging efficiency A/Ne; from the engine speed Ne and an average effective pressure; or from the engine speed Ne and a boost pressure.

The output torque increase $\Delta Te$ is the amount by which the engine torque increases when the fuel supply to the engine is increased at times such as during engine warm-up and during acceleration. Because the increase in the fuel supply at this time corresponds to a reduction in the air/fuel ratio of the air-fuel mixture, the engine torque increase $\Delta Te$ is obtained on the basis of air/fuel ratio detection information from the A/F sensor 48 in the exhaust passage. When the A/F sensor 48 is not provided, the engine torque increase $\Delta Te$ may be obtained on the basis of target air/fuel ratio information of the engine air/fuel ratio control.

The shift control valve 64 is normally controlled by the speed feedback control executed by the speed feedback control means 54, but when it is detected that the vehicle is in a substantially stationary state (stationary or moving extremely slowly) the switching means 56 switches control of the shift control valve 64 from speed feedback control to pressure feedback control executed by the pressure feedback control means 55.

In this preferred embodiment, whether or not the vehicle is substantially stationary is determined on the basis of the speed of the secondary pulley 22 (the secondary speed Ns), which corresponds directly to the vehicle speed, and the speed of the primary pulley 21 (the primary speed Np), which corresponds indirectly to the vehicle speed.

That is, it is determined that the vehicle is substantially stationary when either the secondary speed Ns falls below a preset low threshold value Ns1 or the primary speed Np falls below a preset low threshold value Np1. Conversely, when the vehicle has been in a substantially stationary state, it is determined that the vehicle has returned to a traveling state when both the secondary speed Ns has risen above a preset low threshold value Ns2 (>Ns1) and the primary speed Np has risen above a preset low threshold value Np2 (>Np1).

The reason for using both the secondary speed Ns and the primary speed Np to determine whether the vehicle has assumed a substantially stationary state and whether or not it has returned to a traveling state is as follows: When the primary speed Np cannot be correctly detected, naturally the primary speed Np cannot be feedback-controlled; and when the secondary speed Ns cannot be correctly detected, since the target primary speed Npt cannot be set, again the primary speed Np cannot be feedback-controlled. Thus, in the shift control system of this preferred embodiment, the vehicle is deemed to be substantially stationary and control is accordingly switched to pressure feedback control when either the secondary speed Ns or the primary speed Np has become too small to be detected with certainty.

Also, by it being determined on the basis of information from both the primary speed sensor 43 and the secondary speed sensor 44 that the vehicle has returned to a traveling state when the detection values of the two sensors 43, 44 have both risen above the respective threshold values Np2, Ns2, it can be determined rapidly and with certainty that the vehicle has returned to a traveling state. The reason for providing a difference between the determination threshold values Np1 and Np2 and between the determination threshold values Ns1 and Ns2 is to prevent control from becoming unstable, thereby realizing stable control.

In this preferred embodiment, in pressure feedback control, the speed ratio is controlled to a minimum speed ratio with the primary pressure being kept at a suitable level. That is, when the speed ratio is controlled to a minimum speed ratio, the primary pressure Pp is lowered to below the line pressure PL, and at this time the actual primary pressure acting on the hydraulic actuator 21c of the primary pulley 21 is monitored as the primary pressure Pp is appropriately lowered. Of course, when the vehicle accelerates from a substantially stationary state to a traveling state, the switching means 56 restores the control mode of the shift control valve 64 from pressure feedback control to speed feedback control.

Control of the shift control valve 64 is executed through duty control of the shift control solenoid 64A. The control level (shift duty) of this shift control solenoid 64A is calculated in a calculating means (an adder) 58, adding a base shift control level (base shift duty) calculated by a base shift duty calculating means 57 from the oil temperature Toil, the line pressure PL, the speed ratio and the input speed to a control level (shift duty) obtained by performing PID-correction on the deviation ΔNp calculated by the speed feedback control means 54 or to a control level (shift duty) obtained by performing PID-correction on the deviation ΔPp calculated by the pressure feedback control means 55. The oil temperature Toil, the line pressure PL and the input speed can be obtained, for example, from the detection results of the oil temperature sensor, the line pressure sensor 45 and the engine speed sensor 41. The speed ratio can, for example, be calculated from the primary speed Np detected by the primary speed sensor 43 and the secondary speed Ns detected by the secondary speed sensor 44.

In a shift control system of a hydraulic CVT for a vehicle constructed according to the present invention as described above as a first preferred embodiment, shift control is carried out, for example, as shown by the flow chart of FIG. 3. First, in a step S10, a base shift duty is calculated from the oil temperature, the line pressure, the speed ratio and the input speed by the base shift duty calculating means 57. Then, in step S20, it is determined whether or not a flag F1 is 1. This flag F1 is set to 1 when it is determined that the vehicle is traveling and is set to 0 when it is determined that the vehicle is substantially stationary.

Here, for example, when it was determined in the previous control cycle that the vehicle was traveling, processing proceeds to step S30 and step S40. In step S30, it is determined whether the secondary speed Ns is larger than the preset threshold value Ns1 or equal to or smaller than the threshold value Ns1, and in step S40 it is determined whether the primary speed Np is larger than the preset threshold value Np1 or equal to or smaller than the threshold value Np1.

When in step S30 it is determined that the secondary speed Ns is larger than the threshold value Ns1 and also in step S40 it is determined that the primary speed Np is larger than the threshold value Np1, it is determined that the vehicle is in a traveling state and the shift control valve 64 is controlled by the speed feedback control means 54 so that the speed of the primary pulley 21 approaches a target value.

That is, processing proceeds to step S50 and the target primary speed setting means 54A sets a primary target speed Npt of the primary pulley 21 on the basis of the secondary speed Ns, which is a parameter corresponding to the speed of the vehicle and the accelerator angle, which is a parameter corresponding to the load on the vehicle engine. Processing then proceeds to step S60, and the calculating means 54B calculates the deviation ΔNp (=Npt−Np) between the actual speed Np of the primary pulley 21 and the target speed Npt, after which the PID correcting means 54C calculates a shift duty (control level) by performing PID-correction on this deviation ΔNp.

Then in step S70 the flag F1 is kept at 1, after which processing proceeds to step S80 and the shift control solenoid 64A is driven by duty control using speed feedback control on the basis of the base shift duty calculated in step S10 and the shift duty obtained in step S60.

On the other hand, when in step S30 the secondary speed Ns is determined to be not greater than the threshold value Ns1, or when in step S40 the primary speed Np is determined to be not greater than the threshold value Np1, it is inferred that the vehicle is substantially stationary and the shift control valve 64 is controlled by the pressure feedback control means 55 so that the hydraulic pressure being applied to the primary pulley 21 (the primary pressure Pp) approaches a target value (the target primary pressure Ppt).

That is, processing proceeds to step S110, and the target primary pressure setting means 55A sets a target value (target primary pressure Ppt) of the primary pressure Pp on the basis of the input torque inputted to the belt-type CVT 20. Processing then proceeds to step S120, and the calculating means 55B calculates the deviation ΔPp (=Ppt−Pp) between the actual primary pressure Pp and the target primary pressure Ppt and the PID correcting means 55C calculates a shift duty (control level) by performing PID-correction on this deviation ΔPp.

In step S130 the flag F1 is set to 0 and then processing proceeds to step S80, in which the shift control solenoid 64A of the shift control valve 64 is driven by duty control using pressure feedback control on the basis of the base shift duty calculated in step S10 and the shift duty obtained in step S120.

When it is determined that the vehicle is substantially stationary and the flag F1 is set to 0, thereafter, processing proceeds from step S20 to step S90 and step S100. In step S90 it is determined whether the secondary speed Ns is equal to or greater than the preset threshold value Ns2, and in step S100 it is determined whether the primary speed Np is equal to or greater than the preset threshold value Np2.

When in step S90 it is determined that the secondary speed Ns is less than the threshold value Ns2, or when in step S100 it is determined that the primary speed Np is less than the threshold value Np2, it is inferred that the vehicle is still substantially stationary and the shift control solenoid 64A is duty-controlled by pressure feedback control (steps S120, S80) as described above.

On the other hand, when it is determined in step S90 that the secondary speed Ns is equal to or greater than the threshold value Ns2 and also it is determined in step S100 that the primary speed Np is equal to or greater than the threshold value Np2, it is inferred that the vehicle has returned to a traveling state and processing proceeds to step S50, step S60, and step S80 and the speed feedback control described above is carried out. Also, in step S70 the flag F1 is set to 1.

In this way, during normal travel, i.e., when the vehicle is not substantially stationary (stationary or moving extremely slowly), the switching means 56 selects speed feedback control executed by the speed feedback control means 54 and the shift control solenoid 64A of the shift control valve 64 is duty-controlled in correspondence with the shift duty from the speed feedback control means 54 and thereby controlled using speed feedback so that the primary speed Np approaches the target primary speed Npt. By this means, the primary pulley speed is controlled to a state such that the speed ratio is optimal.

When on the other hand the vehicle has become substantially stationary (stationary or moving extremely slowly), the switching means 56 switches control of the shift control valve 64 from speed feedback control executed by the speed feedback control means 54 to pressure feedback control executed by the pressure feedback control means 55. Then, the shift control solenoid 64A of the shift control valve 64 is duty-controlled in correspondence with the shift duty from this pressure feedback control means 55, and the speed ratio is thereby controlled using pressure feedback so that the primary pressure Pp approaches the target primary pressure Ppt. Accordingly, even when the vehicle is substantially stationary and detection of speeds such as the actual primary speed Np of the primary pulley 21 is difficult, by pressure feedback control the speed ratio is controlled optimally while the primary pressure is kept to a suitable value (the target primary pressure). Thus, the primary pressure does not become excessively high and the speed ratio gradually shifting up to the overdrive side during travel in slow-moving traffic is avoided and response from a standstill is maintained acceptable. Because the primary pressure does not become excessively low, belt slippage upon acceleration from a standstill is certainly prevented.

And when the vehicle has accelerated from a substantially stationary state to a traveling state, control of the hydraulic pressure control means of the primary pulley 21 (i.e., the shift control valve 64) is switched by the switching means 56 from pressure feedback control to speed feedback control. As a result, there is also the benefit that thereafter the speed ratio control performance can be accomplished and there is no hindrance to travel.

A second preferred embodiment of a shift control system of a hydraulic CVT for a vehicle according to the invention will now be described. In the preferred embodiment described above, during normal travel, i.e., when the vehicle is not substantially stationary (stationary or moving extremely slowly), the speed ratio is controlled using speed feedback control executed by the speed feedback control means 54, and when the vehicle is substantially stationary the speed ratio is controlled using pressure feedback control executed by the pressure feedback control means 55. In the following second preferred embodiment, when during pressure feedback control executed by the pressure feedback control means 55 a predetermined condition is reached, the hydraulic pressure supplied to the hydraulic actuator 21c of the primary pulley 21 is controlled by the shift control valve 64 being controlled using open loop control in correspondence with a preset predetermined shift duty (control level).

This predetermined shift duty is a value which fills a hydraulic cylinder (not shown) in the hydraulic actuator 21c of the primary pulley 21 with operating fluid and also is as close as possible to the average value of the shift duty of pressure feedback control. It is preset on the basis of test results or the like. The above-mentioned predetermined condition will be further discussed hereinafter.

Figure 4:
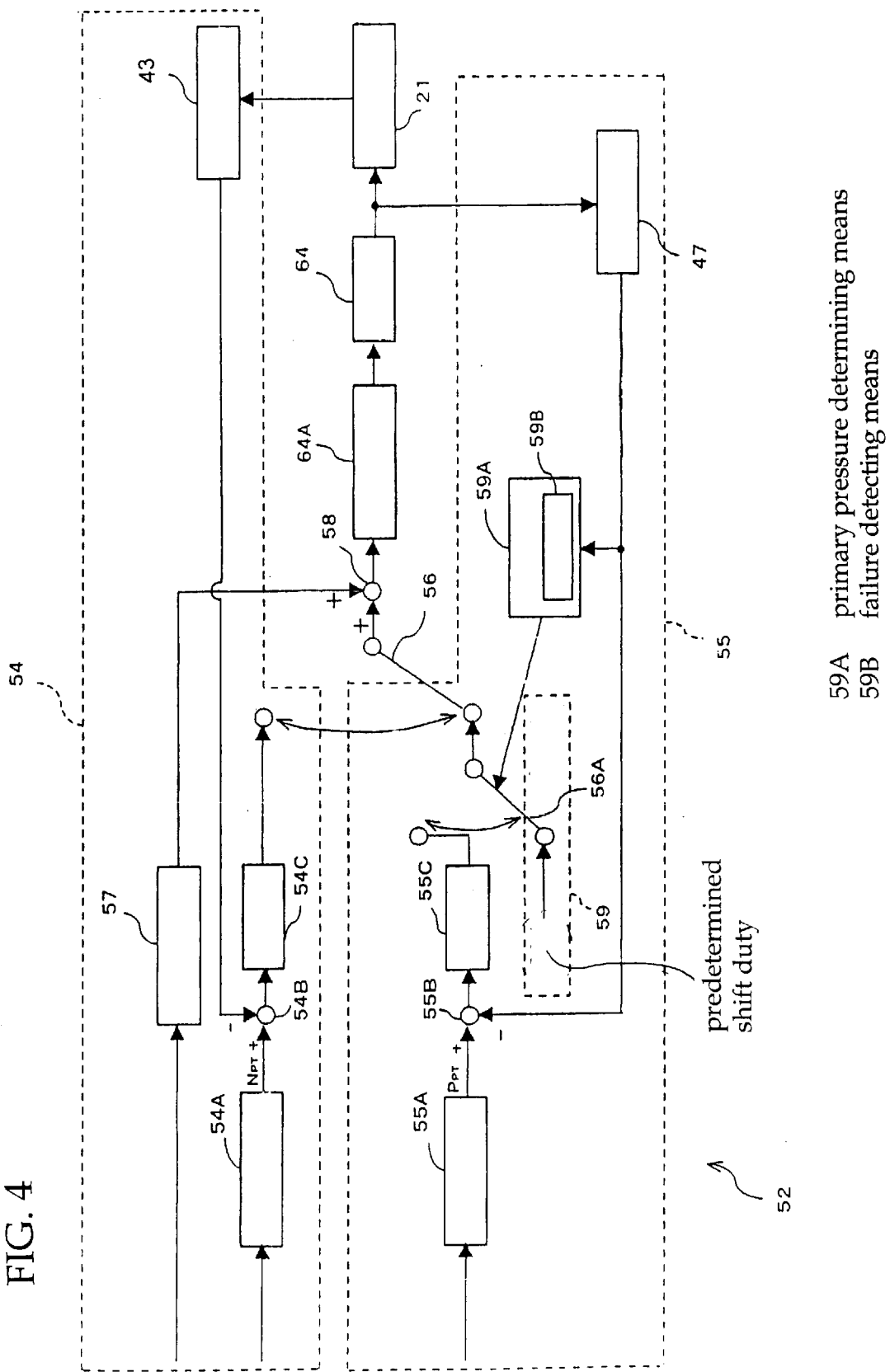
FIG. 4 is a block diagram showing a main part of a second preferred embodiment of a shift control system of a hydraulic CVT for a vehicle according to the invention.

Specifically, as shown in FIG. 4, in this second preferred embodiment, the shift control means 52 is further provided with open loop control means 59 for controlling the shift control valve 64 using open loop control and primary pressure determining means 59A (hydraulic pressure determining means serving as pressure feedback control possibility determining means) for comparing the detection value of the primary pressure sensor 47 with a predetermined range to determine whether the primary pressure sensor 47 has failed.

Figure 5:
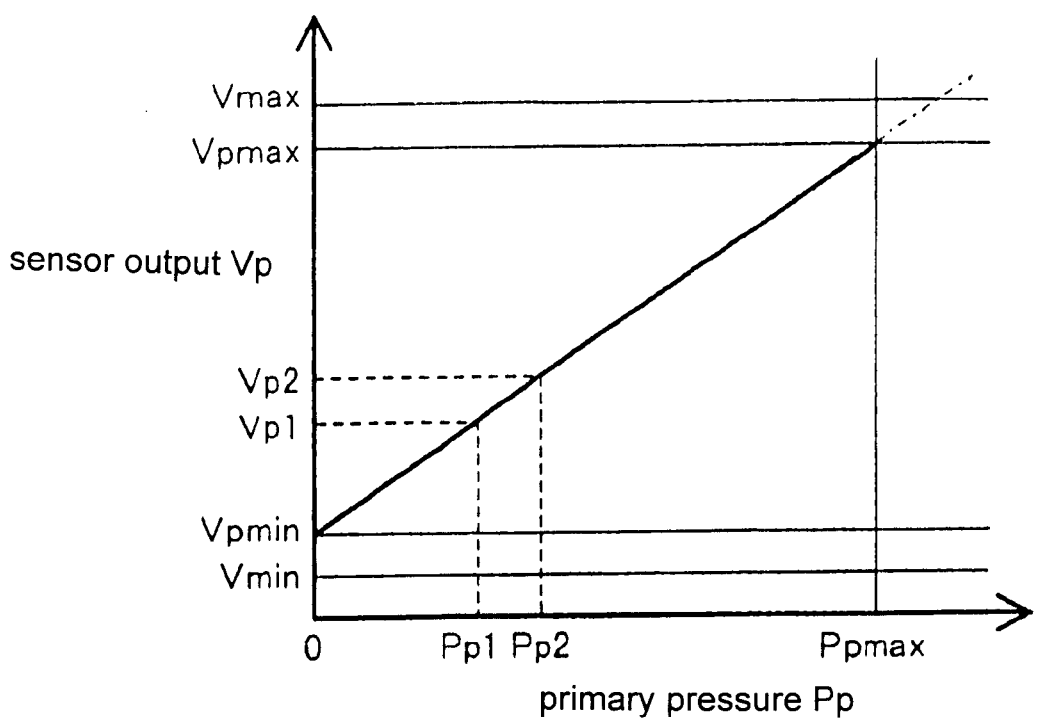
FIG. 5 is a graph showing a relationship between a primary pressure and the output of a primary pressure sensor in the second preferred embodiment.

This primary pressure determining means 59A is means for determining whether the actual primary pressure Pp is within a range such that it can be inferred that the hydraulic cylinder of the primary pulley 21 is filled with operating fluid. In the primary pressure determining means 59A, this determination is carried out on the basis of the relationship shown in FIG. 5 between the actual primary pressure Pp and the sensor output (detection value) Vp of the primary pressure sensor 47.

Specifically, during pressure feedback control, the primary pressure determining means 59A determines whether the sensor output (detection value) Vp of the primary pressure sensor 47 is larger than a preset predetermined output value Vp1, or in other words whether the actual primary pressure Pp is larger than a preset predetermined value Pp1. During open loop control, it determines whether the sensor output Vp is equal to or greater than a preset predetermined output value Vp2 (>Vp1), or in other words whether the actual primary pressure Pp is equal to or greater than a preset predetermined value Pp2 (>Pp1). On the basis of these determinations, when during pressure feedback control the actual primary pressure Pp is lower than the predetermined value Pp1, or when during open loop control the actual primary pressure Pp is equal to or greater than the predetermined value Pp2, the primary pressure determining means 59A outputs a switching command signal to the switching means 56.

Also, the primary pressure determining means 59A includes a failure detecting means 59B. The failure detecting means 59B is means for detecting failure of the primary pressure sensor 47 on the basis of the sensor output Vp of the primary pressure sensor 47. That is, because, when the electrical circuit of the primary pressure sensor 47 has suffered a disconnection or a short-circuit, the sensor output Vp shows an abnormal value which could not arise normally, it is possible to detect whether the primary pressure sensor 47 has failed by determining whether the sensor output Vp is within a predetermined normal range.

Specifically, during pressure feedback control, the failure detecting means 59B determines whether the output Vp of the primary pressure sensor 47 is within a preset range of from a predetermined output Vmin to a predetermined output Vmax (Vmax>Vmin). The predetermined output Vmin is the value of the lowest output Vpmin at which the output Vp of the primary pressure sensor 47 is normal (the value corresponding to when the primary pressure Pp is 0) or is a value lower than the lowest output Vpmin. The predetermined output Vmax is the highest output Vpmax at which the output Vp of the primary pressure sensor 47 is normal (the value corresponding to when the primary pressure Pp is at its maximum value Ppmax) or is a value higher than the highest output Vpmax.

When it has determined continuously for a predetermined time that the output Vp of the primary pressure sensor 47 is below the predetermined output Vmin or when it has determined continuously for a predetermined time that the output Vp is above the predetermined output Vmax, the failure detecting means 59B infers that the primary pressure sensor 47 has failed and instructs the primary pressure determining means 59A to take the output Vp of the primary pressure sensor 47 as the lowest output Vpmin, i.e., to take the actual primary pressure Pp as 0. On the basis of this instruction from the failure detecting means 59B, the primary pressure determining means 59A takes the actual primary pressure Pp as 0 and outputs a switching command signal to the switching means 56.

The switching means 56 has a switching function 56A for, at times when the precondition for pressure feedback control is established (when the vehicle is substantially stationary), switching between pressure feedback control and open loop control on the basis of a switching command signal from the primary pressure determining means 59A. That is, when, during pressure feedback control (when the vehicle is substantially stationary), it is determined by the primary pressure determining means 59A that the actual primary pressure Pp is below the predetermined value Pp1 and accordingly a switching command signal is inputted to the switching means 56 from the primary pressure determining means 59A, the switching means 56 switches control of the shift control valve 64 from pressure feedback control executed by the pressure feedback control means 55 to open loop control executed by the open loop control means 59.

When the precondition for pressure feedback control is established (when the vehicle is substantially stationary) and open loop control is being carried out, it is determined by the primary pressure determining means 59A that the actual primary pressure Pp is above the predetermined value Pp2 and accordingly another switching command signal is inputted to the switching means 56 from the primary pressure determining means 59A, the switching means 56 switches control of the shift control valve 64 back from the open loop control executed by the open loop control means 59 to the pressure feedback control executed by the pressure feedback control means 55.

The determination threshold values Pp1, Pp2 at which switching between pressure feedback control and open loop control is carried out are values for determining that the hydraulic cylinder (not shown) of the primary pulley 21 is filled with operating fluid and are preset on the basis of test results or the like. In the case of these threshold values also, the reason for providing a difference between Pp1 and Pp2 is, as before, to realize stable control.

Even when the primary pressure sensor 47 has failed or when the hydraulic cylinder of the primary pulley 21 is not filled with operating fluid, when the vehicle accelerates from a substantially stationary state to a traveling state, control of the hydraulic pressure control means of the primary pulley 21 is switched by the switching means 56 from open loop control to speed feedback control.

Figure 6:
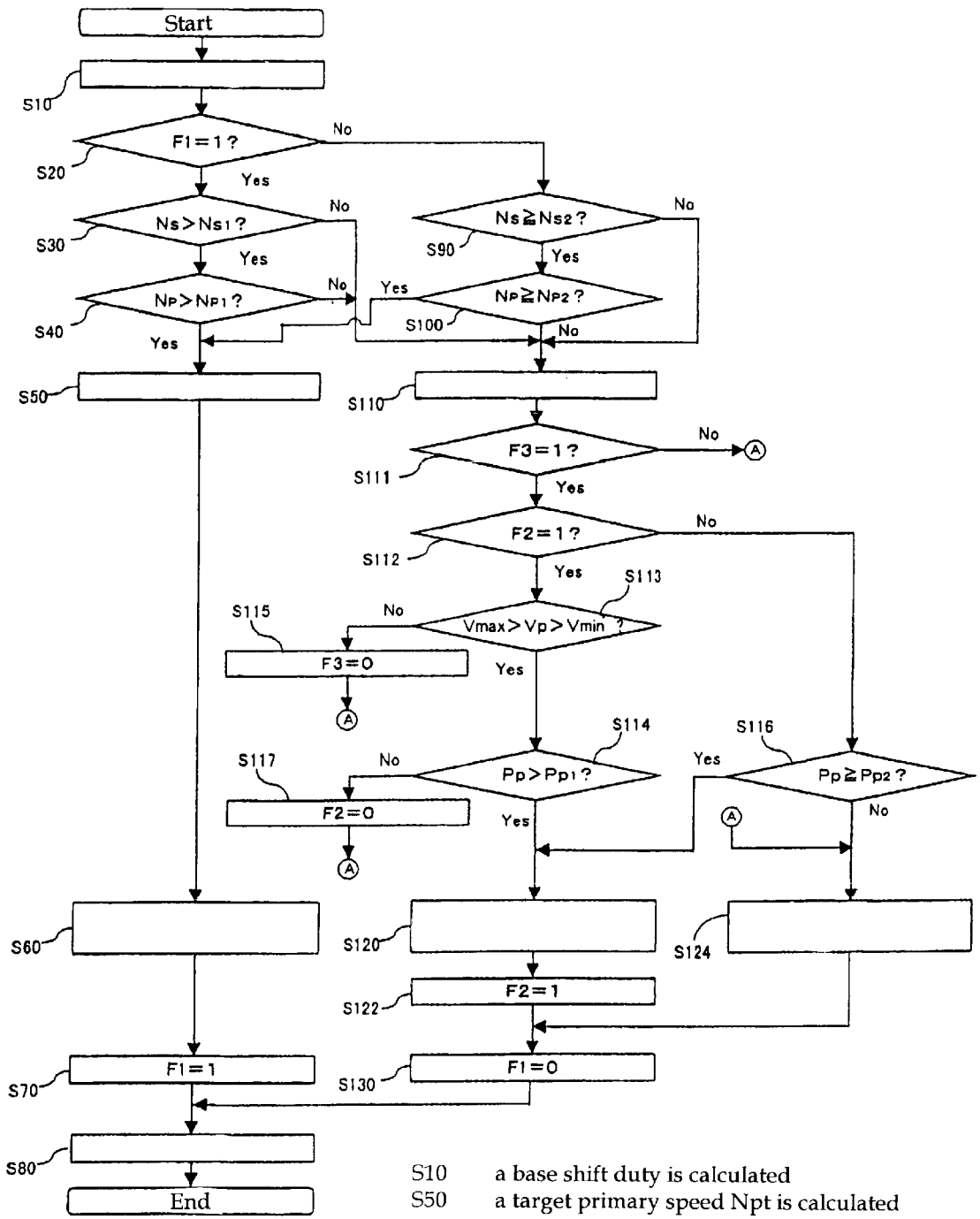
FIG. 6 is a flow chart showing control performed by the shift control system of the second preferred embodiment.

In a shift control system of a hydraulic CVT for a vehicle constructed according to the present invention as described above as a second preferred embodiment, shift control is carried out, for example, as shown by the flow chart of FIG. 6.

That is, as in the first preferred embodiment described above, when by determinations of steps S30 and S40, it is determined that the vehicle is in a traveling state, processing proceeds to step S50, step S60, step S70 and step S80 and the shift control valve 64 is controlled by the speed feedback control means 54 so that the speed Np of the primary pulley 21 approaches a target primary speed Npt.

When on the other hand in step S30 it is determined that the secondary speed Ns is below the threshold value Ns1, or when in step S40 it is determined that the primary speed Np is below the threshold value Np1, it is inferred that the vehicle is substantially stationary and the shift control valve 64 is controlled by the pressure feedback control means 55 so that the hydraulic pressure (the actual primary pressure Pp) applied to the primary pulley 21 approaches a target value (the target primary pressure Ppt).

That is, processing proceeds to step S110, and the target primary pressure setting means 55A sets a target value (target primary pressure) Ppt of the primary pressure on the basis of the input torque inputted to the belt-type CVT 20. Then, in step S111, it is determined whether a flag F3 is 1. This flag F3 is set to 1 when the sensor output Vp of the primary pressure sensor 47 is within the range of from Vmin to Vmax, i.e., when the primary pressure sensor 47 is normal and pressure feedback control is executable, and is set to 0 when the sensor output Vp of the primary pressure sensor 47 is below Vmin or above Vmax, i.e., when the primary pressure sensor 47 has failed and satisfactory control cannot be ensured with pressure feedback control. The initial value of the flag F3 is 1.

If the flag F3 is 1, processing proceeds to step S112 and determines whether a flag F2 is 1. This flag F2 is set to 1 when an actual primary pressure Pp above a predetermined level is being obtained and thus pressure feedback control is executable, and is set to 0 when an actual primary pressure Pp above a predetermined level is not being obtained and thus satisfactory control cannot be ensured with pressure feedback control. The initial value of the flag F2 is 1.

If the flag F2 is 1, processing proceeds to step S113 and the failure detecting means 59B determines whether the sensor output Vp of the primary pressure sensor 47 is in the range of from Vmin to Vmax, and, if there, the sensor output Vp is within the range of from Vmin to Vmax, it is inferred that the primary pressure sensor 47 is normal and processing proceeds to step S114.

In step S114, the primary pressure determining means 59A determines whether the actual primary pressure Pp is larger than or equal to or smaller than the predetermined value Pp1. Here, if the actual primary pressure Pp is larger than the predetermined value Pp1, it is determined that an actual primary pressure Pp above a predetermined level is being obtained, that is, that the hydraulic cylinder of the primary pulley 21 is filled with operating fluid and pressure feedback control is executable, and processing proceeds to step S120. In this step S120, the calculating means 55B calculates the deviation ΔPp (=Ppt−Pp) between the actual primary pressure Pp and the target primary pressure Ppt and the PID correcting means 55C calculates a shift duty (control level) by performing PID-correction on this deviation ΔPp.

Then, in step S122 the flag F2 is kept at 1 and in step S130 the flag F1 is set to 0, after which processing proceeds to step S80 and on the basis of the base shift duty calculated in step S10 and the shift duty obtained in step S120 the speed ratio is controlled by the shift control solenoid 64A of the shift control valve 64 being duty-controlled using pressure feedback control so that the primary pressure Pp approaches the target primary pressure Ppt.

When, on the other hand, in step S113 the failure detecting means 59B determines continuously for a predetermined time that the sensor output Vp of the primary pressure sensor 47 is either below Vmin or above Vmax, it infers that the primary pressure sensor 47 has failed and in step S115 the flag F3 is set to 0 and processing proceeds to step S124 and sets the shift duty to a preset predetermined value. Then, in step S130 the flag F1 is set to 0, after which processing proceeds to step S80 and on the basis of the base shift duty calculated in step S10 and the predetermined shift duty set in step S124 the speed ratio is controlled by the shift control solenoid 64A of the shift control valve 64 being duty-controlled using open loop control.

When in step S111 the flag F3 is 0, processing proceeds to step S124 and the respective processing described above is executed and then the processing of step S130 and step S80 is executed.

If in step S114 the actual primary pressure Pp is below the predetermined value Pp1, it is inferred that an actual primary pressure Pp above the predetermined level is not being obtained, i.e., the hydraulic cylinder of the primary pulley 21 is not being filled with operating fluid and thus satisfactory control cannot be ensured with pressure feedback control. Accordingly, in step S117 the flag F2 is set to 0 and then processing proceeds to step S124 and sets the shift duty to the preset predetermined value. Then, in step S130 the flag F1 is set to 0 and processing proceeds to step S80 and on the basis of the base shift duty calculated in step S10 and the shift duty set in step S124 the speed ratio is controlled by the shift control solenoid 64A of the shift control valve 64 being duty-controlled using open loop control.

When in step S112 the flag F2 is 0, processing proceeds to step S116 and the primary pressure determining means 59A determines whether the actual primary pressure Pp is equal to or above the predetermined value Pp2 or less than the predetermined value Pp2. Here, if the actual primary pressure Pp is equal to or above the predetermined value Pp2, it is inferred that an actual primary pressure Pp above the predetermined level is being obtained and the hydraulic cylinder of the primary pulley 21 is being filled with operating fluid, i.e., that pressure feedback control is executable. Processing proceeds to step S120, step S122, step S130 and step S80 and pressure feedback control is carried out as described above. When on the other hand the actual primary pressure Pp is less than the predetermined value Pp2, processing proceeds to step S124 and the respective processing described above is carried out, and then the processing of step S130 and step S80 is carried out.

When it is determined that the vehicle is in a substantially stationary state and accordingly the flag F1 is set to 0, thereafter processing proceeds from step S20 to step S90 and step S100. In step S90 it is determined whether the secondary speed Ns is equal to or above the preset threshold value Ns2, and in step S100 it is determined whether the primary speed Np is equal to or above the preset threshold value Np2.

When in step S90 it is determined that the secondary speed Ns is less than the threshold value Ns2, or when in step S100 it is determined that the primary speed Np is less than the threshold value Np2, because the vehicle is still in a substantially stationary state, as described above, depending on determination results of whether the flag F3 is 1or 0 (step S111), whether the flag F2 is 1or 0 (step S112), whether the sensor output Vp of the primary pressure sensor 47 is within the range of from Vmin to Vmax (step S113), whether the actual primary pressure Pp is larger than the predetermined value Pp1 (step S114), and whether the actual primary pressure Pp is equal to or greater than the predetermined value Pp2 (step S116), the shift control solenoid 64A is duty-controlled using pressure feedback control (steps S120, S80) or open loop control (steps S124, S80).

When on the other hand it is determined in step S90 that the secondary speed Ns is equal to or above the threshold value Ns2 and also it is determined in step S100 that the primary speed Np is equal to or above the threshold value Np2, it is inferred that the vehicle has returned to a traveling state and processing proceeds to step S50, step S60, step S80 and speed feedback control is carried out. In step S70 the flag F1 is set to 1.

In this way, when the vehicle is substantially stationary and the hydraulic pressure control means of the primary pulley 21 is being controlled on the basis of pressure feedback control executed by the pressure feedback control means 55, if the actual primary pressure Pp falls below the predetermined value Pp1 and also thereafter is less than the predetermined value Pp2, or in other words if the hydraulic cylinder of the primary pulley 21 is not filled with operating fluid and satisfactory control cannot be ensured with pressure feedback control, the switching means 56 switches from pressure feedback control executed by the pressure feedback control means 55 to open loop control executed by the open loop control means 59 and the hydraulic pressure control means is then controlled using this open loop control. Therefore, there is the benefit that the hydraulic pressure control means of the primary pulley 21 is controlled appropriately and quality of control of the speed ratio can be ensured.

Also, when the vehicle is substantially stationary and the hydraulic pressure control means of the primary pulley 21 is being controlled on the basis of pressure feedback control executed by the pressure feedback control means 55, if the sensor output Vp of the primary pressure sensor 47 is either below Vmin or above Vmax, or in other words if the primary pressure sensor 47 has failed and satisfactory control cannot be ensured with pressure feedback control, the actual primary pressure Pp is taken as 0 and the switching means 56 switches from pressure feedback control executed by the pressure feedback control means 55 to open loop control executed by the open loop control means 59 and the hydraulic pressure control means is then controlled using this open loop control. Therefore, there is the benefit that any belt slippage that otherwise might be caused by the primary pressure being deficient is prevented thereby avoiding the worst possible travel situation where the vehicle cannot be driven.

And, even if the primary pressure sensor 47 has failed, when the vehicle has accelerated from a substantially stationary state to a traveling state, control of the hydraulic pressure control means of the primary pulley 21 is switched by the switching means 56 from open loop control to speed feedback control. Therefore, there is the benefit that thereafter satisfactory control of the speed ratio can be ensured and there is no hindrance to travel.

The present invention is not limited to the preferred embodiments described above, and various changes can be made without deviating from the scope of the invention.

For example, although in these preferred embodiments the speed ratio is controlled to a minimum speed ratio when the vehicle is substantially stationary, the invention is not limited to this. That is, the speed ratio could alternatively be controlled to an intermediate speed ratio expected from the relationship between the line pressure PL and the primary pressure Pp. And the determination of whether the vehicle is traveling or substantially stationary may alternatively be made on the basis of just one or the other of the secondary speed Ns and the primary speed Np, or on the basis of another parameter related to the vehicle speed.

Also, the line pressure regulating valve 63 and the shift control valve 64 are not limited to control by duty solenoids 63A, 64A, and control using linear solenoids can alternatively be applied.

A warning lamp may be provided inside the passenger compartment of the vehicle to be illuminated when failure of the primary pressure sensor 47 is detected by the failure detecting means 59B. When this is done, the vehicle can be swiftly taken to a service site and the failed primary pressure sensor 47 repaired or replaced.

In the invention as described in the second preferred embodiment, if the pressure feedback control would otherwise be invoked the hydraulic pressure is too low, control is switched instead to open loop control, with which a hydraulic pressure can be ensured by means of a predetermined shift duty. Consequently, the speed ratio can be controlled with unstable control occurring due to repeated overshooting and undershooting of the hydraulic pressure being prevented. Accordingly, the invention is not limited to systems for performing hydraulic pressure feedback control only when a vehicle is substantially stationary, as in this preferred embodiment, and can be applied widely to systems for controlling hydraulic control devices using hydraulic pressure feedback control.

Also, the invention is not limited to application to belt-type CVT's and can be applied widely to hydraulic CVT's in general, and, for example, can also be applied to toroidal-types.

As described above in detail, in a shift control system of a hydraulic CVT for a vehicle according to the present invention, when the vehicle is not substantially stationary, i.e., when the vehicle is not either stationary or traveling extremely slowly, the hydraulic pressure control means is controlled using speed feedback control, and when the vehicle is substantially stationary the hydraulic pressure control means is controlled using pressure feedback control. As a result, when the vehicle is substantially stationary, the hydraulic pressure acting on the rotating elements of the CVT can be maintained while the speed ratio is controlled exactly to a target value. Because the hydraulic pressure does not become excessively high, the speed ratio gradually shifting up to overdrive (maximum speed ratio) during travel in slow-moving traffic can be avoided and response upon acceleration from a standstill acceptable. Because the hydraulic pressure does not become excessively low, belt slippage upon acceleration from a standstill can be avoided.

Also, in a shift control system of a hydraulic CVT for a vehicle according to the present invention, when the hydraulic pressure control means is being controlled by pressure feedback control, wherein the hydraulic pressure being applied to a rotating element is feedback-controlled to a set target pressure, it is monitored whether the state of the transmission is such that pressure feedback control is possible, and when it is determined that pressure feedback control is not possible, control of the hydraulic pressure control means is switched from pressure feedback control to open loop control, wherein a predetermined hydraulic pressure is caused to be applied to the rotating element. Consequently, problems associated with deficiency of the hydraulic pressure acting on the rotating element can be prevented.

For example, the system can be so constructed that when a main part of a rotating element is not filled with operating fluid control of the hydraulic pressure control means is switched from pressure feedback control to open loop control, so that control is prevented from becoming unstable due to repeated overshooting and undershooting of the hydraulic pressure. Thus, there is the benefit that even when, for example, at times such as immediately after starting the basic pressure of the hydraulic system (the line pressure or the like) is low and consequently the hydraulic cylinder of a rotating element is not filled with operating fluid, hydraulic control of the rotating element, i.e., control of the speed ratio, can be maintained acceptable.

What is claimed is:

1. A shift control system of a hydraulic continuously variable transmission for an automotive vehicle having a hydraulic pressure control means for controlling with a hydraulic pressure the behavior of a rotating element and a speed feedback control means for setting a target speed of the rotating element on the basis of a speed of the vehicle and a load on the engine of the vehicle and feedback-controlling the hydraulic pressure control means so that an actual speed of the rotating element approaches the target speed, comprising:

an actual hydraulic pressure detecting means for detecting an actual value of a hydraulic pressure acting on the rotating element;

a target hydraulic pressure setting means for setting a target value of the hydraulic pressure acting on the rotating element;

a pressure feedback control means for feedback-controlling the hydraulic pressure control means so that the actual hydraulic pressure detected by the actual hydraulic pressure detecting means approaches the target hydraulic pressure set by the target hydraulic pressure setting means;

a stationary state detecting means for detecting whether the vehicle is in a substantially stationary state; and a control means for controlling the hydraulic pressure control means using speed feedback control executed by the speed feedback control means when it is detected by the stationary state detecting means that the vehicle is not in a substantially stationary state and controlling the hydraulic pressure control means using pressure feedback control executed by the pressure feedback control means when it is detected by the stationary state detecting means that the vehicle is in a substantially stationary state.

2. A shift control system according to claim 1, further comprising:

an open loop control means for open loop to control the hydraulic pressure control means so that a predetermined hydraulic pressure acts on the rotating element; and pressure feedback control possibility determining means for determining whether a state of the transmission is such that pressure feedback control executed by the pressure feedback control means is possible, wherein after the presence of a stationary state is detected by the stationary state detecting means, and it is determined by the pressure feedback control possibility determining means that pressure feedback control is not possible, the control means switches control of the hydraulic pressure control means from pressure feedback control executed by the pressure feedback control means to open loop control executed by the open loop control means.

3. A shift control system according to claim 2, further comprising failure detecting means for detecting failure of the actual hydraulic pressure detecting means, wherein, when failure of the actual hydraulic pressure detecting means is detected by the failure detecting means, the pressure feedback control possibility determining means determines that pressure feedback control is not possible.

4. A shift control system according to claim 3, wherein the failure detecting means determines whether a detection value from the actual hydraulic pressure detecting means is within a predetermined range and determines that the actual hydraulic pressure detecting means has failed when the detection value is outside the predetermined range.

5. A shift control system according to claim 2, wherein the pressure feedback control possibility determining means determines that pressure feedback control is not possible when the actual hydraulic pressure acting on the rotating element detected by the actual hydraulic pressure detecting means is below a reference hydraulic pressure.

6. A shift control system of a hydraulic continuously variable transmission for an automotive vehicle having a hydraulic pressure control means for controlling with a hydraulic pressure the behavior of a rotating element and a shift control means for controlling a speed ratio by controlling the hydraulic pressure control means, comprising:

an actual hydraulic pressure detecting means for detecting an actual value of a hydraulic pressure acting on the rotating element;

a target hydraulic pressure setting means for setting a target value of the hydraulic pressure acting on the rotating element;

a pressure feedback control means for feedback-controlling the hydraulic pressure control means so that a detection value from the actual hydraulic pressure detecting means approaches the target value set by the target hydraulic pressure setting means;

an open loop control means for open loop controlling the hydraulic pressure control means so that a predetermined hydraulic pressure acts on the rotating element;

a pressure feedback control possibility determining means for determining whether or not a state of the transmission is such that pressure feedback control executed by the pressure feedback control means is possible; and a control means for, when the hydraulic pressure control means is being pressure feedback controlled by the pressure feedback control means and it is determined by the pressure feedback control possibility determining means that pressure feedback control is not possible, switching control of the hydraulic pressure control means from pressure feedback control executed by the pressure feedback control means to open loop control executed by the open loop control means, wherein the pressure feedback control possibility determining means determines at least according to one of a failure situation of the actual hydraulic pressure detecting means and the actual value of a hydraulic pressure acting on the rotating element.

7. A shift control system according to claim 6, further comprising failure detecting means for detecting failure of the actual hydraulic pressure detecting means, wherein, when failure of the actual hydraulic pressure detecting means is detected by the failure detecting means the pressure feedback control possibility determining means determines that pressure feedback control is not possible.

8. A shift control system according to claim 7, wherein the failure detecting means determines whether or not a detection value from the actual hydraulic pressure detecting means is within a predetermined range and determines that the actual hydraulic pressure detecting means has failed when the detection value is outside the predetermined range.

9. A shift control system according to claim 6, wherein the pressure feedback control possibility determining means determines that pressure feedback control is not possible when the actual hydraulic pressure acting on the rotating element detected by the actual hydraulic pressure detecting means is below a reference hydraulic pressure.

10. A shift control system according to claim 6, further comprising:

a vehicle speed detecting means for detecting a vehicle speed;

a speed detecting means for detecting a speed of the rotating element;

a target speed setting means for setting a target speed of the rotating element on the basis of the vehicle running state; and a speed feedback control means for feedback-controlling the hydraulic pressure control means so that a detection value from the speed detecting means approaches the target value set by the target speed setting means, wherein, when the detection value from the vehicle speed detecting means rises above a predetermined value, the control means switches control of the hydraulic pressure control means from pressure feedback control executed by the pressure feedback control means or open loop control executed by the open loop control means to speed feedback control executed by the speed feedback control means.

11. A shift control method for controlling a speed ratio of a hydraulic continuously variable transmission for an automotive vehicle wherein the behavior of a rotating element is controlled with a hydraulic pressure, comprising the steps of:

detecting whether the vehicle is in a substantially stationary state; and when the vehicle is not in a substantially stationary state, performing speed feedback control so that a speed of the rotating element approaches a target speed set on the basis of a speed of a vehicle and a load on the engine of the vehicle, and when the vehicle is in a substantially stationary state, performing pressure feedback control so that a hydraulic pressure acting on the rotating element approaches a set target hydraulic pressure.

12. A shift control method according to claim 11, further comprising the steps of:

when the vehicle is in a substantially stationary state, determining whether a state of the transmission is such that the pressure feedback control is possible; and when it is determined that the pressure feedback control is not possible, switching from the pressure feedback control to open loop control wherein a predetermined hydraulic pressure is caused to be applied to the rotating element.

13. A shift control method according to claim 12, further comprising the steps of:
    when the vehicle is in a substantially stationary state, determining whether an actual hydraulic pressure detecting means for detecting an actual value of the hydraulic pressure acting on the rotating element has failed; and
    when it is determined that the actual hydraulic pressure detecting means has failed, determining that the pressure feedback control is not possible.

14. A shift control method according to claim 12, further comprising the steps of:
    when the vehicle is in a substantially stationary state, determining whether the actual hydraulic pressure acting on the rotating element is below a reference hydraulic pressure; and
    when it is determined that the actual hydraulic pressure acting on the rotating element is below the reference hydraulic pressure, determining that the pressure feedback control is not possible.

15. A shift control method for a controlling a speed ratio of a hydraulic continuously variable transmission for an automotive vehicle wherein the behavior of a rotating element is controlled with a hydraulic pressure, comprising the steps of:
    detecting an actual value of the hydraulic pressure acting on the rotating element;
    setting a target value of the hydraulic pressure acting on the rotating element;
    performing pressure feedback control so that the actual hydraulic pressure acting on the rotating element approaches the target value;
    determining whether a state of the transmission is such that the pressure feedback control is possible, at least according to one of a failure situation of detecting the actual value of the hydraulic pressure and the actual value of a hydraulic pressure acting on the rotating element; and
    when it is determined that the pressure feedback control is not possible, switching from the pressure feedback control to open loop control wherein a predetermined hydraulic pressure is caused to be applied to the rotating element.

16. A shift control method according to claim 15, further comprising the steps of:
    determining whether actual hydraulic pressure detecting means for detecting the actual value of the hydraulic pressure acting on the rotating element has failed; and
    when it is determined that the actual hydraulic pressure detecting means has failed, determining that the pressure feedback control is not possible.

17. A shift control method according to claim 15, further comprising the steps of:
    determining whether the actual hydraulic pressure acting on the rotating element is below a reference hydraulic pressure; and
    when it is determined that the actual hydraulic pressure acting on the rotating element is below the reference hydraulic pressure, determining that the pressure feedback control is not possible.

18. A shift control method according to claim 15, further comprising the steps of:
    detecting a vehicle speed;
    detecting a speed of the rotating element;
    setting a target value of a speed of the rotating element on the basis of a vehicle running state; and
    when the pressure feedback control or the open loop control is being carried out, the vehicle speed rises above a predetermined value, switching from the pressure feedback control or the open loop control to speed feedback control wherein the speed of the rotating element is feedback-controlled to approach the target value.

\* \* \* \* \*